United States Patent [19]
McNaught

[11] Patent Number: 5,803,216
[45] Date of Patent: Sep. 8, 1998

[54] RETRACTABLE EXTENSION CORD HOLDER AND RECEPTACLE FOR AN AUTOMOBILE

[76] Inventor: Terry Joshua Robert McNaught, RR#3, Rimbey, Alberta, Canada, T0C-2J0

[21] Appl. No.: 866,132

[22] Filed: May 30, 1997

[51] Int. Cl.⁶ .................................................. H02G 11/02
[52] U.S. Cl. ........................................................ 191/12.4
[58] Field of Search ..................... 191/12.2 R, 12.2 A, 191/12.4; 242/371, 385.1

[56] References Cited

U.S. PATENT DOCUMENTS

| | | | |
|---|---|---|---|
| D. 335,865 | 5/1993 | Sanders | D13/137 |
| 4,061,290 | 12/1977 | Harrill | 191/12.2 R |
| 4,293,759 | 10/1981 | Higgins | 191/12.4 |
| 4,585,194 | 4/1986 | Schwob | 191/12.4 |
| 4,778,125 | 10/1988 | Hu | 191/12.2 R |
| 4,842,108 | 6/1989 | Anderson et al. | 191/12.4 |
| 5,056,698 | 10/1991 | Kozakevich | 191/12.2 R |
| 5,115,116 | 5/1992 | Reed | 191/12.2 R |
| 5,255,767 | 10/1993 | Norwood | 191/12.2 R |

FOREIGN PATENT DOCUMENTS

| | | | |
|---|---|---|---|
| 740644 | 11/1955 | United Kingdom | 191/12.4 |
| 881145 | 11/1961 | United Kingdom | 191/12.4 |

*Primary Examiner*—S. Joseph Morano

[57] ABSTRACT

A retractable extension cord holder and receptacle for an automobile including a housing securable to a front bumper of a vehicle. An electrical receptacle is disposed within a side face of the housing. An aperture is formed through a side face opposite the electrical receptacle. A spring-activated spool is disposed within the housing. A length of cord is included having a first end coupled with the electrical receptacle. The length of cord is wrappedly about the spool. A second end of the length of cord extends outwardly of the aperture in the side face of the housing. The second end of the cord has a plug secured thereto.

7 Claims, 4 Drawing Sheets

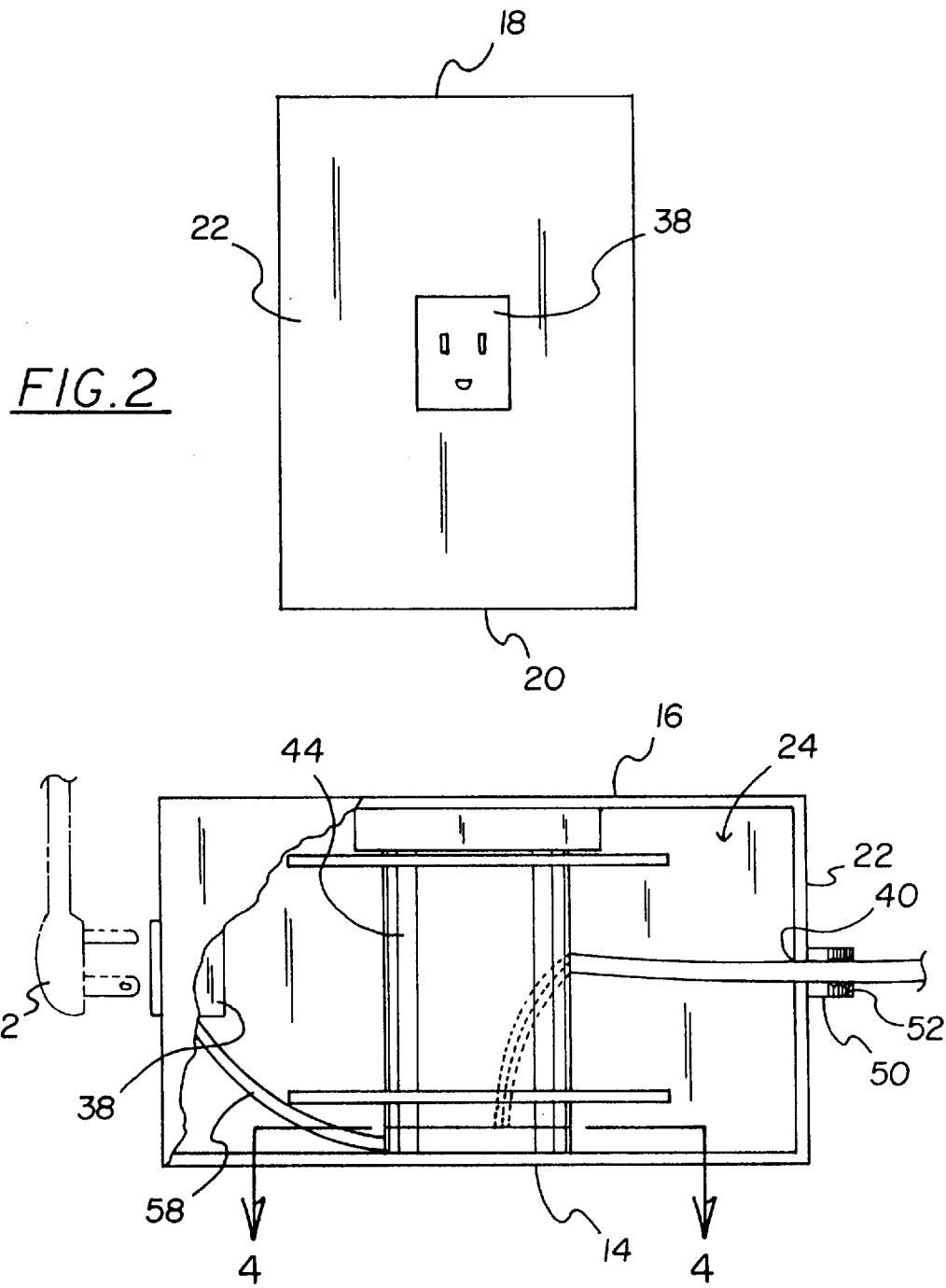

RETRACTABLE EXTENSION CORD HOLDER AND RECEPTACLE FOR AN AUTOMOBILE

BACKGROUND OF THE INVENTION

1. Field of the Invention

The present invention relates to a retractable extension cord holder and receptacle for an automobile and more particularly pertains to providing a convenient means for power adjacent to the automobile with a retractable extension cord holder and receptacle for an automobile.

2. Description of the Prior Art

The use of automobile power cords is known in the prior art. More specifically, automobile power cords heretofore devised and utilized for the purpose of storing power cords on an automobile are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,255,767 to Norwood discloses a cord reel license-plate holder.

U.S. Pat. No. 5,056,698 to Kozakevich discloses an electric cord holder for automotive vehicle.

U.S. Pat. No. Des. 335,865 to Sanders discloses the ornamental design for a retractable extension cord for a car.

U.S. Pat. No. 4,061,290 to Harrill discloses an extension cord reel and case.

U.S. Pat. No. 4,778,125 to Hu discloses an extension cord winding device.

U.S. Pat. No. 4,585,194 to Schwob discloses a retractable winder for storing the power cord of an electric flat-iron and electric flat-iron equipped with a winder of this type.

While these devices fulfill their respective, particular objective and requirements, the aforementioned patents do not describe a retractable extension cord holder and receptacle for an automobile for providing a convenient means for power adjacent to the automobile.

In this respect, the retractable extension cord holder and receptacle for an automobile according to the present invention substantially departs from the conventional concepts and designs of the prior art, and in doing so provides an apparatus primarily developed for the purpose of providing a convenient means for power adjacent to the automobile.

Therefore, it can be appreciated that there exists a continuing need for new and improved retractable extension cord holder and receptacle for an automobile which can be used for providing a convenient means for power adjacent to the automobile. In this regard, the present invention substantially fulfills this need.

SUMMARY OF THE INVENTION

In the view of the foregoing disadvantages inherent in the known types of automobile power cords now present in the prior art, the present invention provides an improved retractable extension cord holder and receptacle for an automobile. As such, the general purpose of the present invention, which will be described subsequently in greater detail, is to provide a new and improved retractable extension cord holder and receptacle for an automobile and method which has all the advantages of the prior art and none of the disadvantages.

To attain this, the present invention essentially comprises a housing having a generally rectangular configuration. The housing is defined by a front face, a rear face, a top face, a bottom face, two side faces and a hollow interior. The housing has apertures extending through the front face and the rear face in corners thereof for receiving fasteners therethrough for securement to a front bumper of a vehicle. An electrical receptacle is disposed within one of the two side faces of the housing. An aperture is formed through the side face opposite the electrical receptacle. A spring-activated spool is disposed within the hollow interior of the housing. The spool is rotatably positioned between the front face and rear face of the housing. A grommet is secured to an outer surface of the side face of the housing disposed over the aperture therethrough. An opening is formed through the grommet having a plurality of scraping elements therein. A length of cord is included having a first end coupled with the electrical receptacle. The length of cord is wrappedly about the spool. A second end of the length of cord extends outwardly of the aperture in the side face of the housing and through the grommet. The second end of the cord has a plug secured thereto.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved retractable extension cord holder and receptacle for an automobile which has all the advantages of the prior art automobile power cords and none of the disadvantages.

It is another object of the present invention to provide a new and improved retractable extension cord holder and receptacle for an automobile which may be easily and efficiently manufactured and marketed.

It is a further object of the present invention to provide a new and improved retractable extension cord holder and receptacle for an automobile which is of durable and reliable construction.

An even further object of the present invention is to provide a new and improved retractable extension cord holder and receptacle for an automobile which is susceptible of a low cost of manufacture with regard to both materials and labor, and which accordingly is then susceptible of low prices of sale to the consuming public, thereby making such a retractable extension cord holder and receptacle for an automobile economically available to the buying public.

Even still another object of the present invention is to provide a new and improved retractable extension cord holder and receptacle for an automobile for providing a convenient means for power adjacent to the automobile.

Lastly, it is an object of the present invention to provide a new and improved retractable extension cord holder and receptacle for an automobile including a housing securable to a front bumper of a vehicle. An electrical receptacle is disposed within a side face of the housing. An aperture is formed through a side face opposite the electrical receptacle. A spring-activated spool is disposed within the housing. A length of cord is included having a first end coupled with the electrical receptacle. The length of cord is wrappedly about the spool. A second end of the length of cord extends outwardly of the aperture in the side face of the housing. The second end of the cord has a plug secured thereto.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a side elevation view of the present invention.

FIG. 3 is a cross-sectional plan view of the present invention.

The same reference numerals refer to the same parts through the various Figures.

DESCRIPTION OF THE PREFERRED EMBODIMENT

Figure 1:
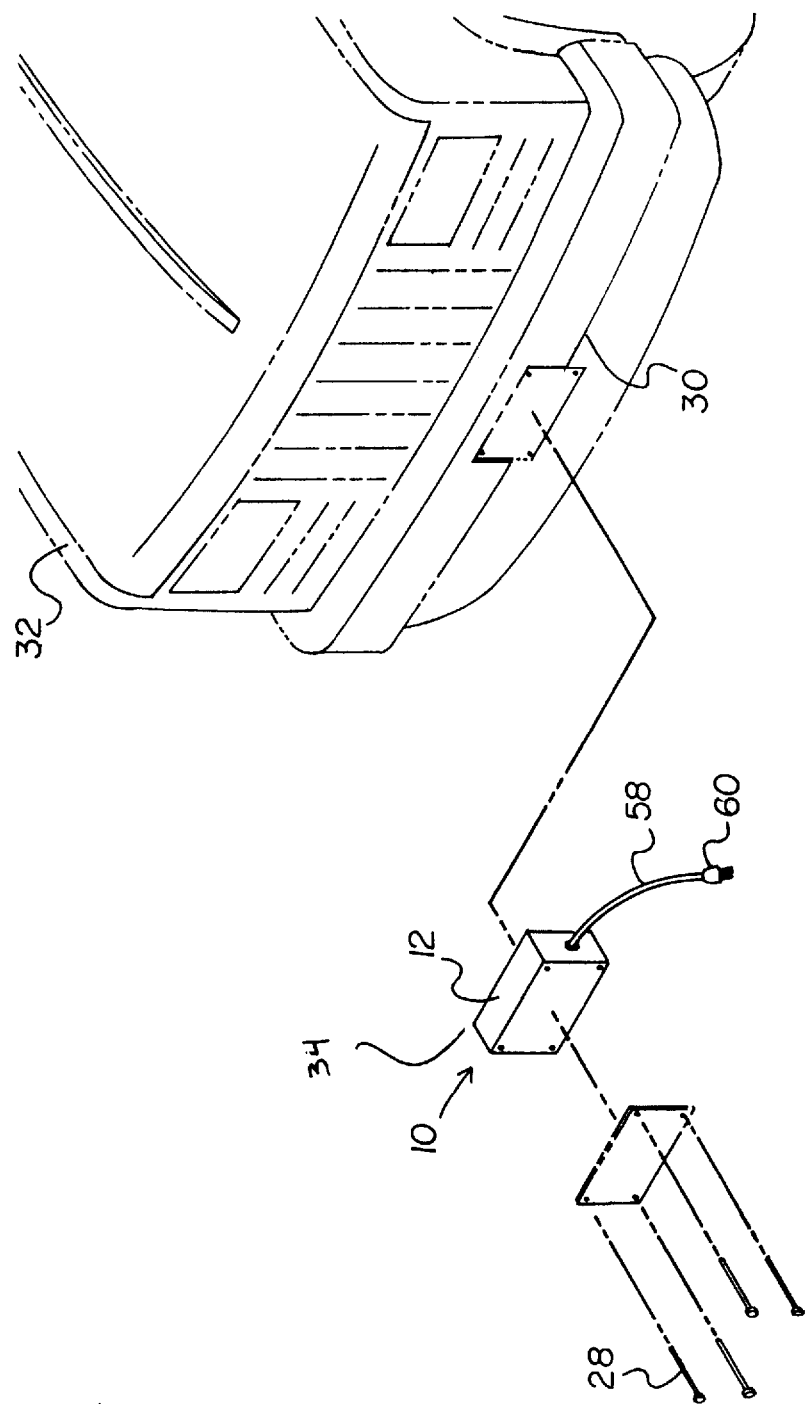
FIG. 1 is a perspective view of the preferred embodiment of the retractable extension cord holder and receptacle for an automobile constructed in accordance with the principles of the present invention.
Figure 4:
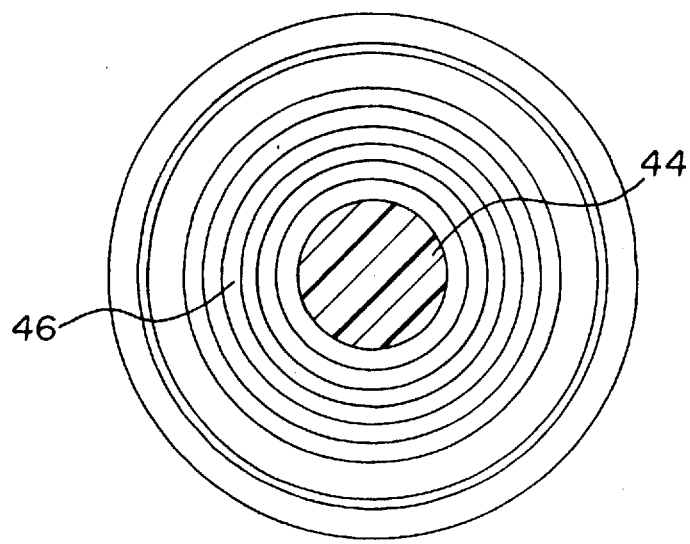
FIG. 4 is a cross-sectional view as taken along line 4—4 of FIG. 3.

With reference now to the drawings, and in particular, to FIGS. 1 through 5 thereof, the preferred embodiment of the new and improved retractable extension cord holder and receptacle for an automobile embodying the principles and concepts of the present invention and generally designated by the reference number 10 will be described.

Specifically, it will be noted in the various Figures that the device relates to a retractable extension cord holder and receptacle for an automobile for providing a convenient means for power adjacent to the automobile. In its broadest context, the device consists of a housing, an electrical receptacle, a spring-activated spool, a grommet and a length of cord. Such components are individually configured and correlated with respect to each other so as to attain the desired objective.

The device 10 includes a housing 12 having a generally rectangular configuration. The housing 12 is defined by a front face 14, a rear face 16, a top face 18, a bottom face 20, two side faces 22 and a hollow interior 24. The housing 12 has apertures 26 extending through the front face 14 and the rear face 16 in corners thereof for receiving fasteners 28 therethrough for securement to a front bumper 30 of a vehicle 32. Note FIG. 1. Additionally, the housing 12 is sized to accommodate a standard license plate 34 thereon whereby the device 10 is secured to the vehicle 32 so that it is hidden by the license plate 34.

An electrical receptacle 38 is disposed within one of the two side faces 22 of the housing 12. Note FIGS. 2 and 3. An aperture 40 is formed through the side face 22 opposite the electrical receptacle 38. An outlet cover could be provided to keep the receptacle clean and dry when not in use. The electrical receptacle 38 is a standard female connection known in the art adapted for receiving a standard plug 42. Note FIG. 3.

A spring-activated spool 44 is disposed within the hollow interior 24 of the housing 12. The spool 44 is rotatably positioned between the front face 14 and rear face 16 of the housing 12. Note FIGS. 3–5. The spool 44 includes a coil spring 46, best illustrated in FIG. 4, to facilitate the automatic wounding of the spool 44.

A grommet 50 is secured to an outer surface of the side face 22 of the housing 12 disposed over the aperture 40 therethrough. An opening 52 is formed through the grommet 50 having a plurality of scraping elements 54 therein.

A length of cord 58 is included having a first end coupled with the electrical receptacle 38. While not shown for the purpose of clarity, such coupling is ideally effected with common brush and O-ring contacts, as is conventional in the art of motors and the like. The length of cord 58 is wrappedly about the spool 44. A second end of the length of cord 58 extends outwardly of the aperture 40 in the side face 22 of the housing 12 and through the grommet 50. The second end of the cord 58 has a plug 60 secured thereto. The plug 60 allows for electrical coupling with a power supply. As the cord 58 retracts through the grommet 50 around the spool 44, the plurality of scraping elements 54 will remove snow and ice from the cord 58 thereby precluding its entrance into the housing 12. When the cord 58 is pulled out, it will automatically lock at the extended position, until it is tugged to release the coil spring 46. This is accomplished with components commonly utilized in the art of window shades and the like.

Figure 5:
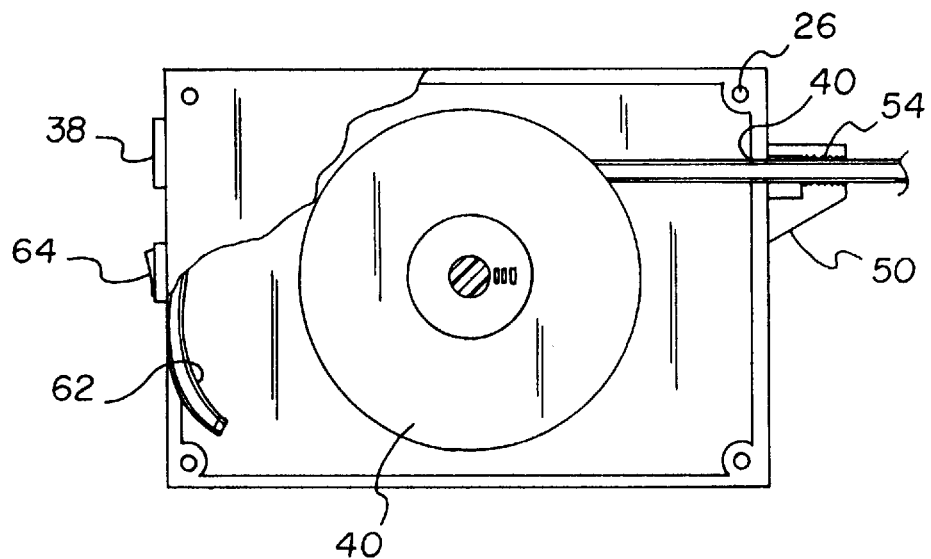
FIG. 5 is a cross-sectional side view of a second embodiment of the present invention.

A second embodiment of the present invention is shown in FIG. 5 and includes substantially all of the components of the present and invention further including means for warming the length of cord 58. The means for warming the length of cord 58 is preferably comprised of heat tape 62 disposed around the length of cord 58. An on/off switch 64 can be included within the side face 22 of the housing 12 and is cooperatively engaged with the heat tape 62 for selectively activating the heat tape 62. The heat tape 62 will allow for the length of cord 58 to remain flexible in cold weather.

Figure 6:
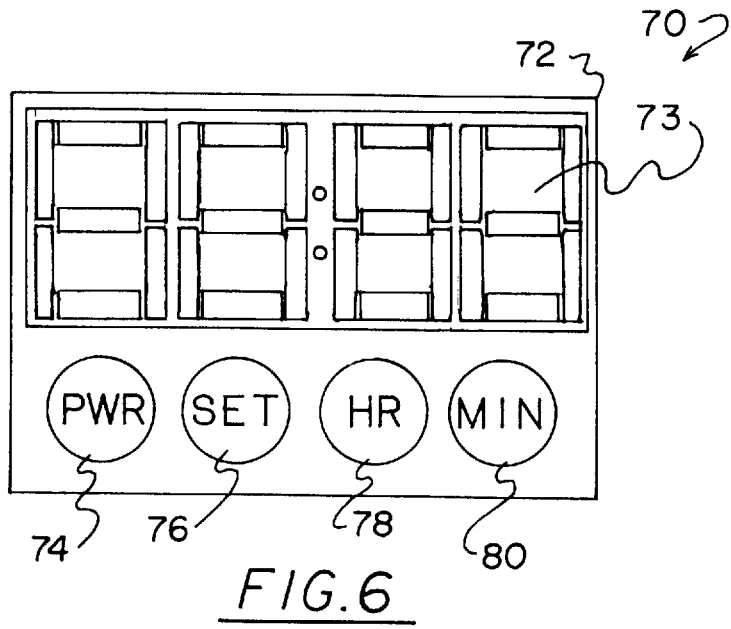
FIG. 6 is a top view of the digital display of another alternate embodiment of the present invention.
Figure 7:
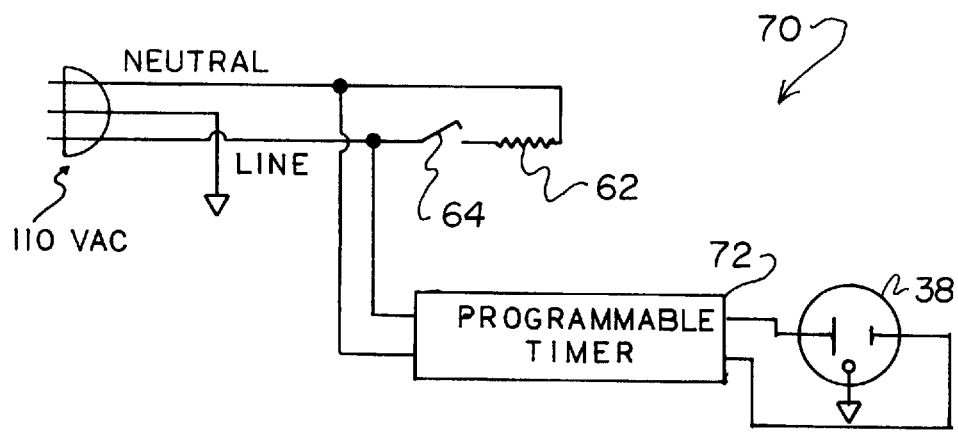
FIG. 7 is a schematic showing the electrical interconnection of all the components of the second embodiment and the embodiment shown in FIG. 6.

In yet another alternate embodiment 70 of the present invention shown in FIGS. 6 & 7, a programmable timer 72 is included for automatically allowing power to be supplied to the electrical receptacle 38. As shown in FIG. 7, the programmable timer and receptacle are electrically connected in parallel with the heat tape and associated switch. As such, the heat tape and receptacle are governed independently via the switch and the programmable timer, respectively. In the alternative, both the receptacle 38 and the heat tape may be connected such that they are both controlled by the programmable timer. The programmable timer is equipped with a digital display 73 and a plurality of control keys, namely a power button 74, a set button 76, an hour button 78, and a minute button 80. Ideally, the display is situated on the side face of the housing and is readily accessible.

In use of the present alternate embodiment of FIGS. 6 & 7, the programmable timer is adapted to countdown from a set time which may be manually set by first depressing the power button and then setting the time with the set, minute, and hour buttons in a manner similar to that employed in the art of clock radios. Preferably, the timer is capable of counting down from a maximum 24 hour period. It should be noted that once the power button is depressed and the timer is consequently activated, the timer will countdown from the previously set time unless the set button is subsequently depressed and such set time is changed in which case the timer will countdown from the new set time. Once the timer has reached the cessation of the countdown from the set time, it is adapted to allow power to be transmitted between the cord 58 and the receptacle 38. Such transmission is continued for a predetermined time period that is conventionally required to warm an engine. To power the programmable timer, a link with the cord 58 may be made or in the alternative, a watch battery may be employed.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A retractable extension cord holder and receptacle for an automobile for providing a convenient means for power adjacent to the automobile comprising, in combination:

a housing having a generally rectangular configuration, the housing being defined by a front face, a rear face, a top face, a bottom face, two side faces and a hollow interior, the housing having apertures extending through the front face and the rear face in corners thereof for receiving fasteners therethrough for securement to a front bumper of a vehicle;

an electrical receptacle disposed within one of the two side faces of the housing, an aperture formed through the side face opposite the electrical receptacle;

a spring-activated spool disposed within the hollow interior of the housing, the spool being rotatably positioned between the front face and rear face of the housing;

a grommet secured to an outer surface of the side face of the housing disposed over the aperture therethrough, an opening formed through the grommet having a plurality of scraping elements therein;

a length of cord having a first end coupled with the electrical receptacle, the length of cord wrapped about the spool, a second end of the length of cord extending outwardly of the aperture in the side face of the housing and through the grommet, the second end of the cord having a plug secured thereto and;

means for warming the length of the cord.

2. A retractable extension cord holder and receptacle for an automobile comprising:

a housing securable to a front bumper of a vehicle;

an electrical receptacle disposed within a side face of the housing, an aperture formed through a side face opposite the electrical receptacle;

a spring-activated spool disposed within the housing;

a length of cord having a first end coupled with the electrical receptacle, the length of cord wrapped about the spool, a second end of the length of cord extending outwardly of the aperture in the side face of the housing, the second end of the cord having a plug secured thereto; and means for warming the length of the cord.

3. The retractable extension cord holder and receptacle for an automobile as set forth in claim 2 and further comprising a grommet secured to an outer surface of the side face of the housing disposed over the aperture therethrough.

4. The retractable extension cord holder and receptacle for an automobile as set forth in claim 3 wherein an opening formed through the grommet has a plurality of scraping elements therein.

5. The retractable extension cord holder and receptacle for an automobile as set forth in claim 2 wherein the means for warming the length of cord comprising heat tape disposed around the length of cord.

6. The retractable extension cord holder and receptacle for an automobile as set forth in claim 5 and further including an on/off switch cooperatively engaged with the heat tape for selectively activating the heat tape.

7. The retractable extension cord holder and receptacle for an automobile as set forth in claim 2 and further including a programmable timer connected between the electrical receptacle and the length of cord for selectively affording electrical communication therebetween at a predetermined time.

* * * * *